United States Patent
Pitz

(10) Patent No.: US 6,857,368 B2
(45) Date of Patent: Feb. 22, 2005

(54) DEVICE AND METHOD FOR SUPPLYING RADIANT ENERGY ONTO A PRINTING SUBSTRATE IN A PLANOGRAPHIC PRINTING PRESS

(75) Inventor: Heiner Pitz, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 218 days.

(21) Appl. No.: 10/268,190

(22) Filed: Oct. 9, 2002

(65) Prior Publication Data

US 2003/0075063 A1 Apr. 24, 2003

(30) Foreign Application Priority Data

Oct. 10, 2001 (DE) .......................................... 101 49 844
Jul. 26, 2002 (DE) .......................................... 102 34 076

(51) Int. Cl.⁷ .............................................. B41L 35/00
(52) U.S. Cl. .................................... 101/484; 101/424.1
(58) Field of Search ............................ 101/424.1, 416.1

(56) References Cited

U.S. PATENT DOCUMENTS

| | | | |
|---|---|---|---|
| 4,991,506 A | 2/1991 | Rodi ........................ | 101/416.1 |
| 5,832,833 A * | 11/1998 | Burgio ..................... | 101/424.1 |
| 5,858,583 A * | 1/1999 | Dessauer et al. ............. | 430/17 |
| 6,026,748 A | 2/2000 | Reed et al. ................ | 101/424.1 |
| 6,231,652 B1 * | 5/2001 | Koyano et al. .......... | 106/31.27 |
| 6,350,071 B1 * | 2/2002 | Conwell et al. .......... | 400/118.2 |
| 6,401,358 B1 | 6/2002 | Baer et al. ..................... | 34/266 |
| 2002/0148385 A1 | 10/2002 | Woosman et al. ....... | 106/31.27 |

FOREIGN PATENT DOCUMENTS

| | | |
|---|---|---|
| DE | 3934905 | 5/1991 |
| DE | 69415443 | 3/1995 |
| DE | 4435077 | 11/1995 |
| DE | 19807643 | 9/1999 |
| DE | 10131620 | 1/2003 |
| EP | 0355473 | 2/1990 |
| EP | 0641653 | 12/1998 |

* cited by examiner

*Primary Examiner*—Charles H Nolan, Jr.
*Assistant Examiner*—Andrea H. Evans
(74) *Attorney, Agent, or Firm*—Davidson, Davidson & Kappel, LLC

(57) ABSTRACT

A device for supplying radiant energy of a wavelength in the near infrared onto a printing substrate (14) in a planographic printing press, including at least one radiant energy source (10) whose light (12) impinges on the printing substrate (14) on the path (16) of the printing substrate (14) through the printing press at a position (116) downstream of at least one printing nip (18) in a printing unit is described which has the feature that the radiant energy source (10) emits light (12) only in a narrow band, the wavelength of the light being non-resonant to absorption wavelengths of water and preferably being between 700.00 nm and 2500.00 run. Also disclosed is a method for supplying radiant energy. By supplying energy in this frequency range while avoiding absorption resonances of water, an unwanted drying or unnecessary heating of the printing substrate are advantageously reduced while providing energy to the printing ink for its particular drying process. The input of the radiant energy into the printing ink is assisted by an infrared-absorbing agent which is added to the printing ink.

15 Claims, 3 Drawing Sheets

DEVICE AND METHOD FOR SUPPLYING RADIANT ENERGY ONTO A PRINTING SUBSTRATE IN A PLANOGRAPHIC PRINTING PRESS

Priority is claimed to German Patent Application No. DE 101 49 844.6, filed Oct. 10, 2001, and German Patent Application No. DE 102 34 076.5, filed Jul. 26, 2002 the entire disclosures of which are hereby incorporated by reference.

BACKGROUND OF THE INVENTION present invention relates to a device for supplying radiant energy of a wavelength in the near infrared onto a printing substrate in a planographic printing press, including at least one radiant energy source whose light impinges on the printing substrate on the path of the printing substrate through the printing press at a position downstream of at least one printing nip in a printing unit. Moreover, the present invention relates to a method for supplying radiant energy of a wavelength in the near infrared onto a printing substrate in a planographic printing press.

Depending on the type of printing ink and the underlying particular drying process, printing machines, in particular, planographic printing presses such as lithographic printing presses, rotary printing presses, offset printing presses and the like, which process sheet or web stock, in particular, paper, paperboard, cardboard and the like, are known to have different devices which cause or assist the ink to adhere to the printing substrate by supplying radiant energy to the printing ink present on the substrate.

The so-called "UV inks" are cured by polymerization which is induced by photoinitiation using light in the ultraviolet. On the other hand, solvent-containing printing inks which can be subject to both a physical and a chemical drying process are widespread. The physical drying includes the evaporation of solvents and the diffusion into the printing substrate (absorption), whereas "chemical drying" or "oxidative drying" are understood to mean drying due to the polymerization of the oils, resins, binding agents or the like included in the ink formulations, possibly with the participation of atmospheric oxygen. Generally, the drying processes are dependent on each other since, because of the absorption of the solvents, a separation between solvents and resins occurs within the binder system, as a result of which the resin molecules can get close to one another and, possibly, be polymerized more easily.

For example, European Patent Application No. 0 355 473 A2 describes a method for drying printed products which includes a radiant energy source in the form of a laser. The radiant energy is directed onto the surface of the printing substrates, which are moved by a transport device on a path through the printing press, at a position between individual printing units or downstream of the last printing unit before or in the delivery. In this context, the radiation source can be a laser in the ultraviolet for UV inks or a laser in the infrared for heating solvent-containing printing inks. The radiant energy source is located outside the printing press to prevent unwanted heating of parts of the printing press due to heat losses which cannot be avoided or screened off. In this context, the fact that an additional system component must be separately provided to the user of the printing press is a disadvantage.

Moreover, it is known, for example, from U.S. Pat. No. 6,026,748 that a printing press can be provided with a dryer system featuring infrared lamps which emit short-wave infrared light (near infrared) or medium-wave infrared light. Lamp light sources have a wide-band emission spectrum, offering a multitude of wavelengths. Such dryer systems in the infrared have the disadvantage that a relevant portion of the energy is absorbed in the paper, heating the ink only indirectly. Rapid drying is only possible with a correspondingly high energy input. However, inter alia, there is a risk for the printing substrate to dry unevenly and buckle in the process.

In electrophotographic printing, it is known, for example, from German Patent Application No. 44 35 077 A1, to fix toner on a recording medium using radiant energy in the near infrared which is emitted by diode lasers. By using a narrow-band light source, the toner particles are heated in order for them to melt, form a color layer, and to be anchored to the surface of the recording medium. Since a great number of common paper types have broad absorption minima in this spectral range, it is possible for a predominant part of the energy to be directly absorbed in the toner particles.

However, simple knowledge of the window in the paper's absorption spectrum cannot be immediately made use of in printing with solvent-containing printing inks since, as described above, this technology is based on other chemical or physical drying processes. In the context of the present invention, the term "solvent-containing printing ink" is meant to refer, in particular, to inks whose solvent components can be of aqueous or organic nature and which are based on binder systems that are oxidatively, ionically or free radically polymerizable. The input of energy for drying solvent-containing printing inks is intended to have the effect of assisting or promoting the evaporation of the solvent and/or the effect of absorption into the printing substrate and/or the effect of polymerization, while at the same time avoiding unwanted side effects such as, in particular, excessive heating of the solvent-containing printing ink which can result in decomposition of components or in overheating of the solvent. Unlike in the case of toner fixing, the energy input is not only intended for the melting of particles.

BRIEF SUMMARY OF THE INVENTION

An object of the present invention is to provide a device and a method which reduce the drying time of solvent-containing printing inks and which are used within a planographic printing press in which such solvent-containing printing ink is used.

The device according to the present invention for supplying radiant energy of a wavelength in the near infrared onto a printing substrate in a planographic printing press features at least one radiant energy source whose light impinges on the printing substrate, in particular, on the freshly printed substrate, on the path of the printing substrate through the printing press at a position downstream of at least one printing nip in a printing unit. It is a feature of the device that the radiant energy source essentially and preferably emits only light whose wavelength is non-resonant to absorption wavelengths of water ($H_2O$). In the context of the present invention, "non-resonant to absorption wavelengths of water" is understood to mean that the absorption of the light energy by water at 20° Celsius is not greater than 10.0%, in a preferred embodiment not greater than 1.0%, in particular, below 0.1%. In the context of the inventive idea, the radiant energy source emits only a very low intensity of light, preferably no light at all, that is resonant to absorption wavelengths of water ($H_2O$).

In an advantageous embodiment, the radiant energy source is narrow-band. In this context, the radiant light source can emit in a range of up to ±50 nm around a wavelength; one or more separate, spectroscopically narrow emission lines being also possible. In an advantageous embodiment, moreover, the emission maximum of the narrow-band radiant energy source or the wavelength of the radiant energy is between 700.00 nm and 3000.00 nm, preferably between 700.00 nm and 2500.00 nm, in particular, between 800.00 nm and 1300.00 nm, in a sub-range of the so-called "window" of the absorption spectrum of paper. Particularly advantageous is an emission at 870.00 nm±50.00 nm and/or 1050.00 nm±50.00 nm and/or 1250.00 nm±50.00 nm and/or 1600.00 nm±50.00 nm.

The present invention is based on the discovery that absorption bands of water contribute to the absorption spectrum of paper. The typical water content of printing substrates in waterless (dampening agent-free) planographic printing already results in unwanted, sometimes even unacceptably high energy absorption in the printing substrate. This absorption is correspondingly even more distinct in planographic printing with dampening agent. Excessive energy input into the printing substrate can consequently be prevented by radiation of a wavelength that is non-resonant to an absorption line or absorption band (absorption wavelength) of water. According to the HITRAN data base, the following absorption by water, to be more precise, by water vapor, occurs at a temperature of 296K, at an absorption path of 1 m, and 15000 ppm water: at 808 nm smaller than 0.5%, at 870±10 nm smaller than 0.01%, at 940±10 nm smaller than 10%, at 980±10 nm smaller than 0.5%, at 1030±30 nm smaller than 0.01%, at 1064 nm smaller than 0.01%, at 1100 nm smaller than 0.5% and at 1250±10 nm smaller than 0.01%. When looking at a surface of the printing substrate, in particular, of the paper, of 1 m² and an air path of 1 m thereabove, then the air contains an amount of water of about 12 g at an absolute humidity of 1.5%. As long as, in an embodiment of the device of the present invention, the light source is no further than 1 m from the printing substrate and the absolute humidity is not markedly higher than 1.5%, the absorptions by water and/or water vapor specified above will not be exceeded. Additional absorption can occur due to the moisture content of the printing substrate if the light penetrates into the printing substrate through the ink layer or because of dampening agent that has been transferred to the sheet through the printing process.

The printing ink can absorb different wavelengths, depending on the functional groups of the individual components in the printing ink, in particular, of the pigment, of the coloring matter or coloring agent, of the binding agent (varnish), of the solvent, of the oil or resin, of the extender, of the auxiliary, of the additives or admixtures or the like. Using the device according to the present invention, light in the near infrared is provided to the printing ink present on the printing substrate in the planographic printing press, while avoiding absorption wavelengths of water, for example, by radiating only a small number of wavelengths of a light source which emits a line spectrum.

The printing ink can contain an infrared-absorbing agent in an inventive manner. The coupling of light into the printing ink and/or an absorption of the radiant energy in the printing ink is produced, enabled, assisted, improved or made easier by the infrared-absorbing agent. In linguistically simplified terms, this description of the present invention speaks of "assist" in this context, which is intended to refer to all degrees of action of the infrared-absorbing agent.

The energy input, which can result in the generation of heat, accelerates the drying of the printing ink. On one hand, it is possible to produce a high temperature in the printing ink (in the ink layer) on the printing substrate for a short time, on the other hand, chemical reactions may be started or initiated, depending on the composition of the printing ink. The infrared-absorbing agent, also referred to as infrared absorber, IR absorber, IR absorber substance or the like, can, on one hand, be a component in the printing ink that has a functional group which absorbs in the near infrared or, on the other hand, it can be an additive or an admixture which is added or admixed to the printing ink prior to printing. In other words, the printing ink can be supplemented with an infrared-absorbing agent or include a component which is modified to an infrared-absorbing agent. In this context, the infrared-absorbing agent preferably has the property of having only little or even no absorption in the visible range of wavelengths in order for the color appearance of the printing ink to be influenced or changed only slightly or even not at all.

A relatively high energy input directly into the printing ink, in particular with the assistance of an infrared-absorbing agent, is advantageously possible without producing an unwanted energy input into the printing substrate. This can be explained, on one hand, by the fact that light cannot be directly absorbed by the printing substrate and, on the other hand, that the energy which is absorbed by the ink layer is distributed over the ink and the printing substrate after fractions of a second. In this context, the heat-absorption capacity and the quantitative proportions are distributed in such a manner that a short heating of the ink layer is possible before the entire printed sheet experiences a homogeneous moderate increase in temperature. This reduces the total energy input required. The selective supply of energy can be assisted, in particular, by radiating a wavelength which is resonant or quasi-resonant to absorption lines of a component of the printing ink or to an absorption line or an absorption maximum of an infrared-absorbing agent in the printing ink. The absorption of the radiant energy in the printing ink is greater than 30%, preferably 50%, in particular 75%, and can be even higher than 90%.

Moreover, the avoidance of energy absorption in water reduces the drying of the printing substrate. This is advantageous because drying of the printing substrate results, inter alia, in a change in its format: due to the so-called "swelling process", the printing substrate has different formats, depending on its drying condition or on its moisture content. The swelling process between the individual printing units results in the requirement for different printing formats in the individual printing units. A change in the moisture content between printing units caused by the influence of a drying which is induced by radiation and which results in variations that can only be determined and corrected in advance with great effort, is prevented by drying the printing ink using the device according to the present invention.

In other words, the device according to the present invention allows the solvent-containing printing ink to dry on the printing substrate without influencing too much the drying of the printing substrate.

To attain as narrow-band as possible an emission with high spectral power density at the same time, it is preferred for the radiant energy source to be a laser. Alternatively, it is also possible to use a broadband light source, such as a carbon IR emitter, with a suitable filter system so that, in combination, a narrow-band radiant energy source is created. One filter can be, in particular, an interference filter. For spatial integration within the planographic printing press, it is preferred for the laser to be a semiconductor laser (diode laser) or a solid laser (titanium-sapphire laser, erbium-glass, NdYAG, Nd-glass or the like). A solid laser can preferably be optically pumped by diode lasers. The solid laser can also be a fiber laser or optical fiber laser, preferably a ytterbium fiber laser, which are able to provide a light output of 300 to 700 W at 1070 nm to 1100 nm at the workstation. Advantageously, such lasers can also be tunable within certain limits. In other words, the output wavelength of the lasers is variable. This allows tuning to a desired wavelength, for example, in resonance or quasi-resonance to an absorption wavelength of a component in the printing ink, in particular, to an infrared-absorbing agent in the printing ink.

Diode lasers or semiconductor lasers are particularly advantageous in the context of the device according to the present invention because they can already be used for the purpose of supplying radiant energy onto a printing substrate without special beam-shaping optics. The light exiting the resonator of a semiconductor laser is highly divergent, producing a beam of light which widens with increasing distance from the output mirror.

In advantageous refinement, the device for supplying radiant energy has a plurality of radiant energy sources which are arranged in a one-dimensional, in a two-dimensional array (locally curved, globally curved or flat) or in a three-dimensional array and whose light impinges on the printing substrate at a number of positions. By using a number of individual radiant energy sources for individual regions on the printing substrate, the maximum required power output of the radiant energy sources is reduced. Light sources of lower power output are generally more cost-effective and have a longer life expectancy. Moreover, excessive generation of waste heat is avoided. The energy input per area through the supply of radiant energy is between 100 and 10.000 $mJ/cm^2$, preferably between 100 and 1000 $mJ/cm^2$, in particular between 200 and 500 $mJ/cm^2$. The printing substrate is irradiated for a period of time between 0.5 ms and is, preferably between 1 ms and 50 ms, in particular between 5 ms and 25.

It is particularly advantageous if the light impinging on the printing substrate at a position is controllable in its intensity and exposure time for each radiant energy source independently of the other radiant energy sources. For this purpose, provision can be made for a control unit, independently of or integrated into the machine control of the planographic printing press. By controlling the parameters of the radiant energy source, it is possible to regulate the supply of energy at different positions of the printing substrate. The input of energy can then be adapted to the coverage of the printing substrate at the present position on the printing substrate. Moreover, it is also advantageous to set up the device of the present invention with a plurality of radiant energy sources in such a manner that light from at least two radiant energy sources impinges at one position on the printing substrate. In this context, beams of light rays are possible which overlap either partially or completely. Then, the maximum required power output of an individual radiant energy source is smaller and, moreover, a redundancy exists in case of a failure of a radiant energy source.

A planographic printing press according to the present invention including at least one printing unit has the feature that it has a device according to the present invention for supplying radiant energy. The planographic printing press according to the present invention can be a direct or indirect offset printing press, a flexographic printing press or the like. On one hand, the position at which the light impinges on the printing substrate in the path through the planographic printing press can be downstream of the last printing nip of the last printing unit of the number of printing units, that is, downstream of all printing nips. On the other hand, the position can also be downstream of a first printing nip and upstream of a second printing nip, that is, at least between two printing units.

In the context of the inventive idea, there is also a method for supplying radiant energy of a wavelength in the near infrared onto a printing substrate in a planographic printing press, to be more precise, for supply into the printing ink on the printing substrate. In the method according to the present invention, a printing substrate is irradiated with light from at least one radiant energy source, the light impinging on the printing substrate on the path of the printing substrate through the printing press at a position downstream of at least one printing nip in a printing unit. To assist or enable the absorption of the radiant energy in the printing ink, at least one infrared-absorbing agent is added to the printing ink. In other words, the absorption of the radiant energy in the printing ink is assisted by an infrared-absorbing agent which is added to the printing ink. The infrared-absorbing agents can be synthesized in a tailored manner for absorption at a specific wavelength which matches a wavelength of a light source, in particular, of a laser. For an existing infrared-absorbing agent having an absorption at a specific wavelength, it is possible to develop special light sources, in particular lasers, which emit at this specific wavelength.

The method according to the present invention for supplying radiant energy can advantageously be carried out with a device for supplying radiant energy as it is described herein. In particular, the emission of the radiant energy source and the absorption of the infrared-absorbing agent are determined, adjusted or provided in an inventive manner such that they match each other. In other words, the radiant energy source is intended to emit a wavelength which corresponds to absorption of the infrared-absorbing agent. Thus, the light emitted by the radiation source is especially preferably quasi-resonant, essentially resonant, in particular resonant to an absorption maximum of the infrared-absorbing agent in order to achieve as good a match as possible of the absorption maximum of the infrared-absorbing agent with the emission maximum of the radiation source. The absorption spectrum of the infrared-absorbing agent used exhibits at least 50%, preferably at least 75%, in particular at least 90% of its absorption maximum in the emission range of the radiation source. An infrared-absorbing agent can have one or more local absorption maxima.

The method according to the present invention for supplying radiant energy can also referred to as a method for drying printing ink or as a method for assisting or accelerating the drying of printing ink because due to the absorption of the infrared-absorbing agent and by avoiding absorption wavelengths of water, a high energy absorption in the printing ink is achieved while at the same time little, preferably very little energy is absorbed the printing substrate. In other words, the method according to the present invention allows the solvent-containing printing ink to dry on the printing substrate without influencing too much the drying of the substrate.

The method according to the present invention for supplying radiant energy can be used especially advantageously in a planographic printing press having a number of printing units in which a number of printing inks are used in printing. At least one of the number of printing inks is blended with an infrared-absorbing agent prior to printing. The blending of the printing ink can be carried out before the ink is received in the printing unit or inside the printing unit; for example, a certain quantity of an infrared-absorbing agent can be added or admixed to at least one of the number of printing inks. The proportion by weight of the infrared-absorbing agent can be smaller than 10%, preferably smaller than 3%, in particular smaller than 1% of the total weight of the printing ink (including the infrared-absorbing agent). When at least two of the number of printing inks are blended, it is possible to use the same infrared-absorbing agent for both printing inks, or a first infrared-absorbing agent for the first of the two printing inks and a second infrared-absorbing agent for the second of the two printing inks. The first and second infrared-absorbing agents can have at least one identical or similar absorption maximum or different absorption maxima. The equivalent applies for more than two infrared-absorbing agents. If the infrared-absorbing agents used have a number of different absorption maxima, it is possible to supply a number of wavelengths of radiant energy.

BRIEF DESCRIPTION OF THE DRAWINGS

Further advantages as well as expedient embodiments and refinements of the present invention will be depicted by way of the following figures and the descriptions thereof, in which.

DETAILED DESCRIPTION

Figure 1:
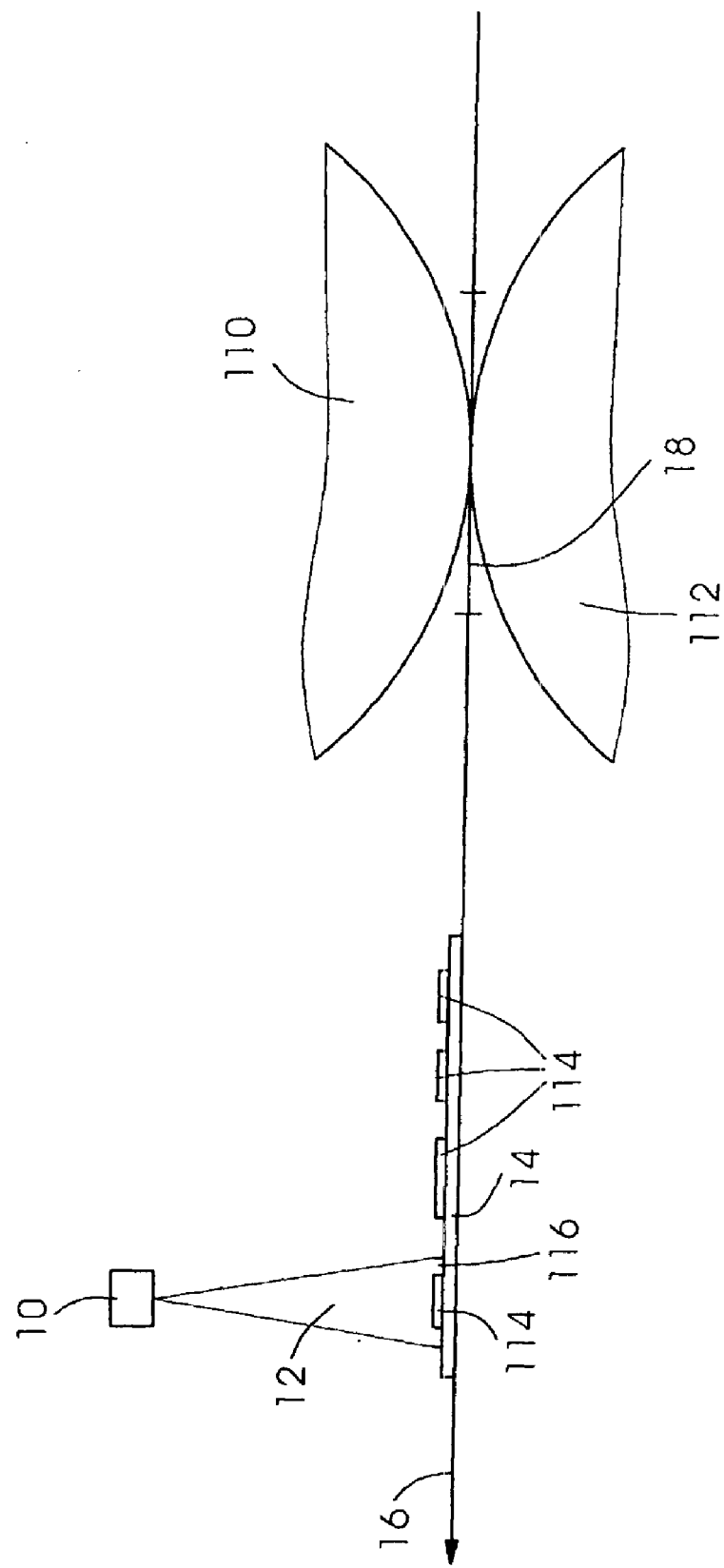
FIG. 1 shows a schematic representation to illustrate the arrangement of the device of the present invention in a planographic printing press.

FIG. 1 shows a schematic representation to illustrate the arrangement of an embodiment of the present invention in a planographic printing press. A radiant energy source 10, in particular a laser, preferably a diode laser or solid laser, is arranged within a planographic printing press in such a manner that light 12 which is emitted by the radiant energy source impinges on a printing substrate 14 on its path 16 through the planographic printing press at a position 116 downstream of a printing nip 18. While in FIG. 1, printing substrate 14 is shown, by way of example, in sheet form, the printing substrate can also be passed through the planographic printing press in web form. The orientation of path 16 of printing substrate 14 is indicated by an arrow. Here, the path is shown to be linear without limitation of a generally curved or non-linear course, in particular, on a circular arc. In the embodiment shown in FIG. 1, printing nip 18 is defined by the interaction of printing cylinder 110 and an impression cylinder 112. Printing cylinder 110 can be a printing form cylinder or a blanket cylinder, depending on the particular printing method in the planographic printing press. On printing substrate 14, there is shown printing ink 114. Light 12, which is emitted by radiation source 10, impinges on printing substrate 14 in the form of a beam or a carpet at a position 116. Printing ink 114 within this position 116 can absorb energy from light 12. Due to the advantageous selection, according to the present invention, of a wavelength which is non-resonant to absorption wavelengths of water, an absorption in printing substrate 14 is reduced.

Figure 2:
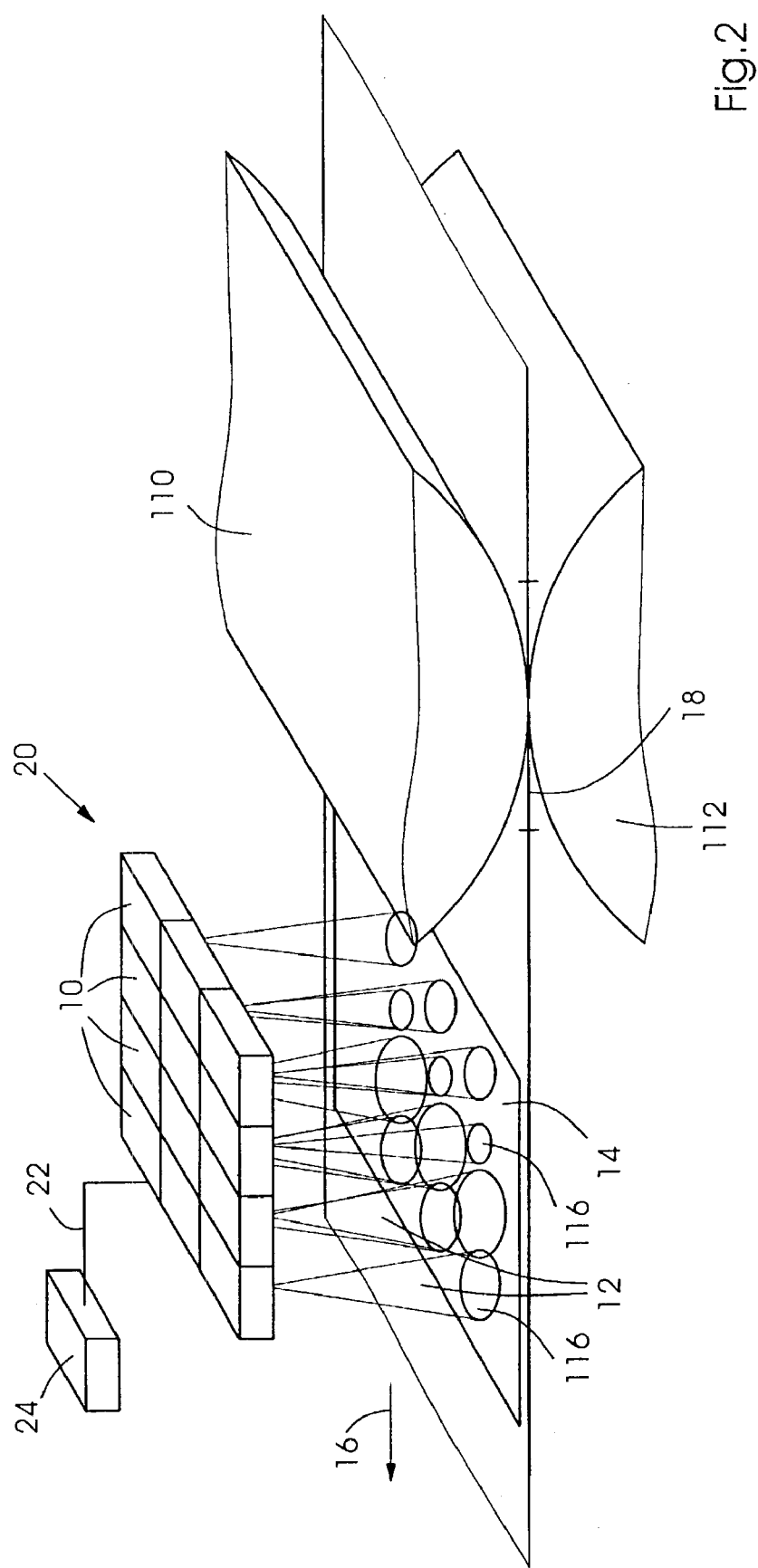
FIG. 2 shows a schematic representation of an advantageous refinement of the device of the present invention in a planographic printing press.

FIG. 2 is a schematic representation of an advantageous refinement of the device according to the present invention in a planographic printing press. There is sketched, by way of example, an array 20 of radiant energy sources 10, here three by four, i.e., twelve radiant energy sources 10. Besides the two-dimensional array 20 shown here, it is also possible to provide a one-dimensional array or a one-dimensional row, oriented across the width of printing substrate 14. A two-dimensional array, just as a three-dimensional array, whose light impinges on printing substrate 14 in a two-dimensional distribution has the advantage, inter alia, that rapid drying is achieved by parallel or simultaneous irradiation of a group of positions in a column of array 20. Consequently, the velocity at which the printing ink moves past radiant energy sources 10 can be higher than in the case of an only one-dimensional array. Array 20 can also have a different number of radiant energy sources 10. Light 12 is supplied onto printing substrate 14 from each of the number of radiant energy sources 10. Positions 116, at which light 12 impinges on printing substrate 14 which follows a path 16 through the planographic printing press, are downstream of a printing nip 118 which is defined by a printing cylinder 110 and an impression cylinder 112. In this context, individual positions 116 can partially coincide, as shown in FIG. 2 for the row of radiant energy sources 10 located at the forward end, or even overlap essentially completely. Array 20 of radiant energy sources 10 is associated with a control device 24 with which the array can exchange control signals via a connection 22. Using control device 24, it is possible to control array 20 in such a manner that energy is supplied according to the amount of printing ink at position 116 on printing substrate 14.

Figure 3:
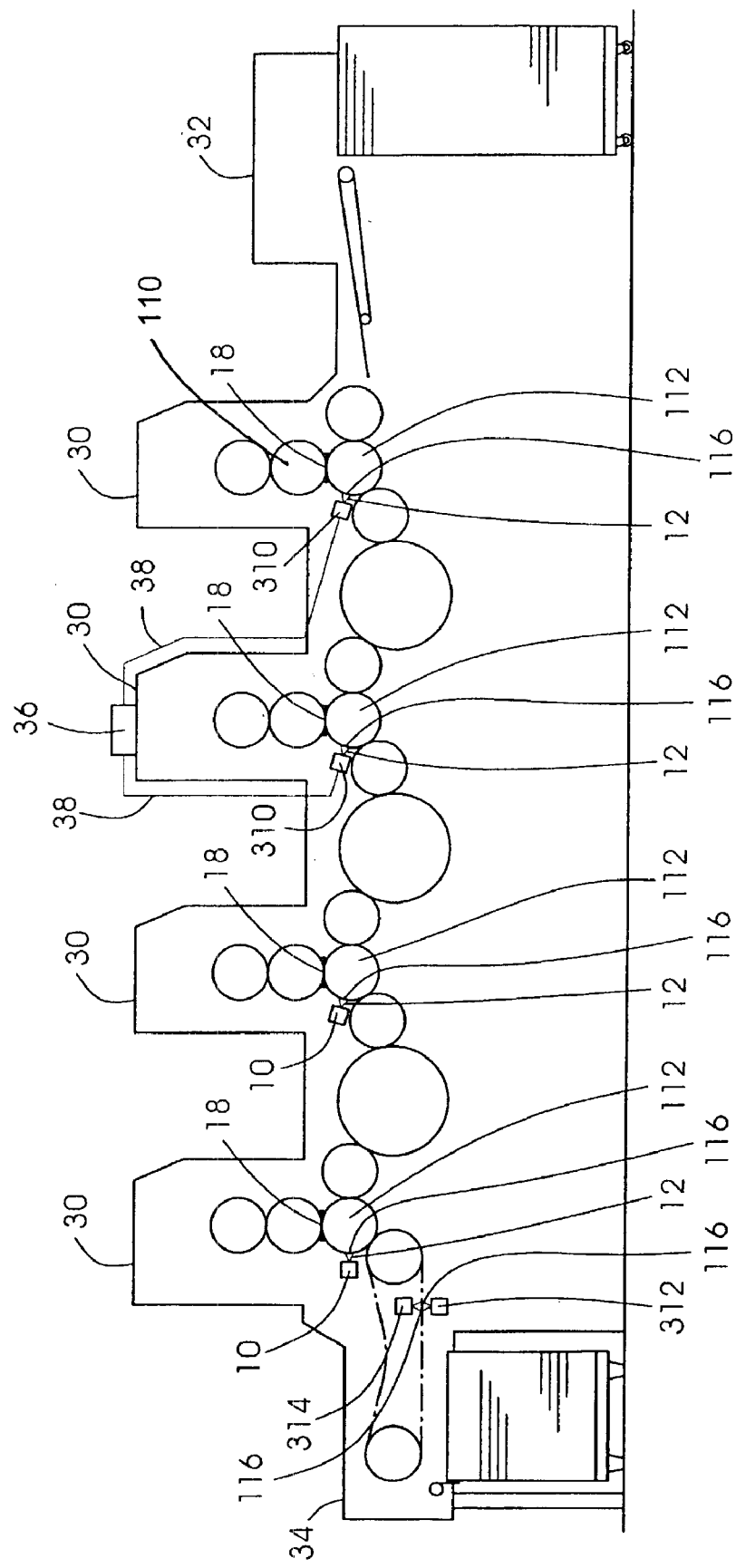
FIG. 3 shows a schematic representation of a planographic printing press featuring diverse alternative arrangements of the inventive device on the printing units or downstream of the last printing unit.

FIG. 3 shows a schematic representation a planographic printing press, in this specific embodiment, a sheet-fed printing press, featuring diverse alternative arrangements of the inventive device on the printing units or downstream of the last printing unit. By way of example, the planographic printing press has four printing units 30, a feeder 32, and a delivery 34. Inside of the planographic printing press, there are shown diverse cylinders which, on one hand, are used for passing the sheets through the machine and which, on the other hand, provide a planographic printing surface, whether directly as a printing form cylinder or as a blanket cylinder. Typical printing units 30 in planographic printing presses further have an inking system and, possibly, a dampening system. Each printing unit 30 includes a printing cylinder 110 and an impression cylinder 112 which define a printing nip 18. At first and second printing units 30, there is shown a central radiant energy source 36 from where light is guided via light guide elements 38, for example, optical waveguides, mirrors, imaging optics and the like, to projection elements 310 which are allocated to printing units 30. Projection elements 310 emit light 12 onto the path of the printing substrate through the planographic printing press at positions 116 which are downstream of the respective printing nips 18 of allocated printing units 30. The use of light guide elements 38 makes it possible to mount radiant energy source 36 at a suitable location within the planographic printing press where there is space for installation. At third and fourth printing units 30, there are shown radiant energy sources 10 from where light 12 is supplied onto path 16 of printing substrate 14 at positions 116 which are downstream of printing nip 18 of the respective printing unit 30. Moreover, an alternative radiant energy source 312 and a further alternative radiant energy source 314 are shown within delivery 34.

Analogous to the arrangements shown in FIG. 3 by way of a sheet-fed printing press, devices according to the present invention for supplying radiant energy can also be advantageously used in a web-fed printing press, in particular, in so-called "web-fed rotary printing presses", whether for example for job printing or newspaper printing.

In one embodiment of the method according to the present invention for supplying radiant energy of a wavelength in the near infrared onto a printing substrate, an infrared-absorbing agent is used which is suitable because of the position of its absorption maximum or maxima in the so-called "window" of the absorption spectrum of paper, in particular, in the so-called "window" of the absorption spectrum of water. A required quantity of infrared-absorbing agent is added to the printing ink as an additive or admixture. This can be accomplished, for example, by stirring the printing ink together with the infrared-absorbing agent outside or inside the planographic printing press. An addition of infrared-absorbing agent is generally only useful for the so-called "chromatic colors", in particular, for four-color offset printing for the colors yellow, magenta and cyan (Y, M and C). An addition for the contrasting color, in four-color offset printing for the color black (K), is generally not necessary since, as a rule, black printing ink has sufficient absorption in the entire relevant and mentioned wavelength range between 700 nm and 2500 nm. However, an addition is nevertheless possible. The required quantity of infrared-absorbing agent is calculated according to the Lambert-Beer extinction law, the layer thickness of the printing ink on the printing substrate and the extinction coefficient. In this representation, the calculations according to the Lambert-Beer extinction law are based on direct resonance, that is, the emission wavelength is in the immediate vicinity of the absorption maximum. In the case of slightly different laser wavelengths, a likewise slightly different absorption is obtained, requiring a correspondingly, preferably proportionally greater amount of infrared-absorbing agent. For irradiation of the printing substrate, a radiant energy source is used whose light is essentially resonant to the absorption maximum of the infrared-absorbing agent. In this embodiment, it is possible to carry out the printing process in the planographic printing press without further measures and without deviating from the conventional printing method.

In a first exemplary embodiment of the method according to the present invention, the infrared-absorbing agent used is 3-butyl-2(2-[-2-(3-butyl-1,1-dimethyl-1,3-dihydro-benzo[e]indol-2-ylidene)ethylidene]-2-chloro-cyclohex-1-enyl]-ethenyl)-1,1-dimethyl-1H-benzo[e]indolium perchlorate having the empirical formula $C_{46}H_{52}Cl_2N_2O_4$ and a molecular weight of 767.84 g mol$^{-1}$. The structural formula of the infrared-absorbing agent is as follows:

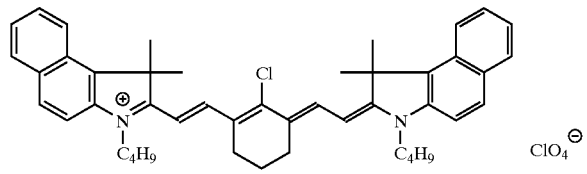

This infrared-absorbing agent has an absorption maximum at 819 nm and a maximum extinction of 615276 (mol*cm)$^{-1}$. For a laser light absorption of approximately 90%, 1.4 percent by weight of the infrared-absorbing agent is required as an additive in the colors C, M and Y for a layer thickness of 2 μm (according to the Lambert-Beer extinction law). (In comparison: 0.9 percent by weight for approximately 75%, 0.4 percent by weight for approximately 50%, and 0.2 percent by weight for approximately 30%). The device for supplying radiant energy includes, as the radiant energy source, a laser which emits at 808 nm; for example, an InGa(Al)As Quantum Well Laser of the MB series from DILAS can be used. The mentioned laser from DILAS has a maximum optical power output of 24 W. The beam geometry downstream of the collimator is 4 mm×12 mm. Thus, the emission wavelength is sufficiently resonant to the absorption maximum of 819±15 nm; the infrared-absorbing agent shows an absorption greater than 50%. In this exemplary embodiment, a beam profile and an irradiation time of 2 ms for an energy per area of 100 mJ/cm$^2$ have been selected, the printing speed being 2 m/s (which corresponds to 14400 prints per hour for a sheet length of 50 cm). The absorption of radiation by water vapor in the air is below 0.5%.

In a second exemplary embodiment of the method according to the present invention, the infrared-absorbing agent used is 2[2-[2chloro-3-[2-(3-ethyl-1,3-dihydro-1,1-dimethyl-2H-benzo[e]indol-2-ylidene)-ethylidene]-1cyclohexen-1-yl]-ethenyl]3-ethyl-1,1dimethyl-1H-benzo[e]indolium tetraflouroborate having the empirical formula $C_{42}H_{44}BClF_4N_2$ and a molecular weight of 699.084 g mol$^{-1}$. The structural formula of the infrared-absorbing agent is as follows:

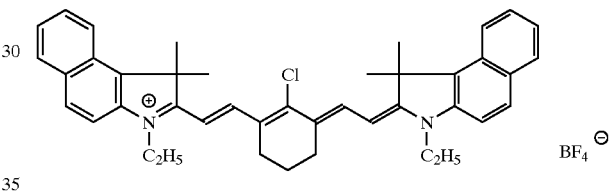

This infrared-absorbing agent has an absorption maximum at 816 mn and a maximum extinction of 898704 (mol*cm)$^{-1}$. For a laser light absorption of approximately 90%, 0.9 percent by weight of the infrared-absorbing agent is required as an additive in the colors C, M and Y for a layer thickness of 2 μm (according to the Lambert-Beer extinction law). (In comparison: 0.5 percent by weight for approximately 75%, 0.3 percent by weight for approximately 50%, and 0.1 percent by weight for approximately 30%). The device for supplying radiant energy includes, as the radiant energy source, a laser which emits at 808 nm; for example, a HLU 100 c 10×12 diode laser from LIMO can be used. The mentioned laser from LIMO has a maximum optical power output of 100 W. The beam geometry downstream of the collimator is 10 mm×12 mm. Thus, the emission wavelength is sufficiently resonant to the absorption maximum of 816±15 nm; the infrared-absorbing agent shows an absorption greater than 50%. In this exemplary embodiment, a beam profile and an irradiation time of 40 ms for an energy per area of 833 mJ/cm$^2$ have been selected, the printing speed being 0.5 m/s (which corresponds to 3600 prints per hour for a sheet length of 50 cm). The absorption of radiation by water vapor in the air is below 0.5%.

In a third exemplary embodiment of the method according to the present invention, the infrared-absorbing agent used is benzenaminium-N,N'-2,5-cyclohexadiene-1,4-diylidenebis [4-(dibutylamino)-N-[4-(dibutylamino)phenyl] diperchlorate having the empirical formula $C_{62}H_{92}Cl_2N_6O_8$ and a molecular weight of 1120.37 g mol$^{-1}$. The structural formula of the infrared-absorbing agent is as follows:

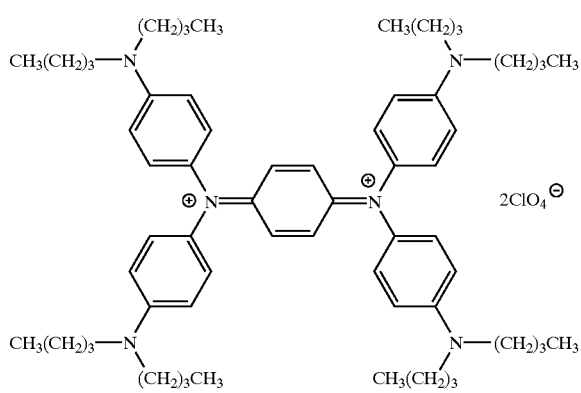

This infrared-absorbing agent has an absorption maximum at 1064 nm and a maximum extinction of 81300 $(mol*cm)^{-1}$. For a laser light absorption of approximately 50%, 4.8 percent by weight of the infrared-absorbing agent is required as an additive in the colors C, M and Y for a layer thickness of 2 μm (according to the Lambert-Beer extinction law). (In comparison: 15.9 percent by weight for approximately 90%, 9.6 percent by weight for approximately 75%, and 2.5 percent by weight for approximately 30%). The device for supplying radiant energy includes, as the radiant energy source, a laser which emits at 1075 nm; for example, a YLR-100 ytterbium fiber laser from IPG Photonics can be used. The mentioned laser from IPG Photonics has a maximum optical power output of 100 W. The beam geometry in the focal plane can be 3 mm×3 mm. Thus, the emission wavelength is sufficiently resonant to the absorption maximum of 1064±15 nm; the infrared-absorbing agent shows an absorption greater than 50%. In this exemplary embodiment, a beam profile and an irradiation time of 5 ms with an energy per area of 417 mJ/cm² have been selected, the printing speed being 2 m/s (which corresponds to 14400 prints per hour for a sheet length of 50 cm). The absorption of radiation by water vapor in the air is below 0.1%.

In a fourth exemplary embodiment of the method according to the present invention, the infrared-absorbing agent used is Bis(3,4-dimethoxy-2'chlorodithiobenzil)nickel having the empirical formula $C_{32}H_{26}Cl_2NiO_4S_4$ and a molecular weight of 732.4 g $mol^{-1}$. The structural formula of the infrared-absorbing agent is as follows:

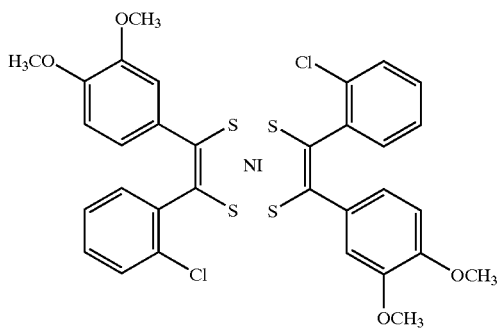

This infrared-absorbing agent has an absorption maximum at 885 nm and a maximum extinction of 160000 $(mol*cm)^{-1}$. For a laser light absorption of approximately 75%, 3.2 percent by weight of the infrared-absorbing agent is required as an additive in the colors C, M and Y for a layer thickness of 2 μm (according to the Lambert-Beer extinction law). (In comparison: 5.3 percent by weight for approximately 90%, 1.6 percent by weight for approximately 50%, and 0.8 percent by weight for approximately 30%). The device for supplying radiant energy includes, as the radiant energy source, a laser which emits at 870 nm; for example, a DLDFC-50 fiber-coupled laser diode system from Laser2000 can be used. The mentioned laser from Laser2000 has a maximum optical power output of 50 W and can be used in CW or pulsed mode operation. Thus, the emission wavelength is sufficiently resonant to the absorption maximum of 885±15 nm; the infrared-absorbing agent shows an absorption greater than 50%. In this exemplary embodiment, a beam profile and an irradiation time of 5 ms with an energy per area of 152 mJ/cm² have been selected, the printing speed being 2 m/s (which corresponds to 14400 prints per hour for a sheet length of 50 cm). The absorption of radiation by water vapor in the air is below 0.1%.

List of Reference Symbols

| | |
|---|---|
| 10 | Radiant energy source |
| 12 | Light |
| 14 | Printing substrate |
| 16 | Path of the printing substrate |
| 18 | Printing nip |
| 110 | Printing cylinder |
| 112 | Impression cylinder |
| 114 | Printing ink |
| 116 | Position on the printing substrate |
| 20 | Array of radiant energy sources |
| 22 | Connection for the transmission of control signals |
| 24 | Control unit |
| 30 | Printing unit |
| 32 | Feeder |
| 34 | Delivery |
| 36 | Central radiant energy source |
| 38 | Light guide element |
| 310 | Projection element |
| 312 | Alternative radiant energy source |
| 314 | Further alternative radiant energy source |

What is claimed is:

1. A device for supplying radiant energy of a wavelength in the near infrared onto a printing substrate in a planographic printing press having a printing unit, comprising:
   at least one radiant energy source providing light to the printing substrate on a path of the printing substrate through the printing press at a position downstream of at least one printing nip in the printing unit,
   the radiant energy source emitting only light having a wavelength non-resonant to absorption wavelengths of water.

2. The device for supplying radiant energy as recited in claim 1 wherein the radiant energy source emits light having a wavelength between 700.00 nm and 2500.00 nm.

3. The device for supplying radiant energy as recited in claim 1 wherein the radiant energy source is a laser.

4. The device for supplying radiant energy as recited in claim 3 wherein the laser is a semiconductor laser or a solid laser.

5. The device for supplying radiant energy as recited in claim 1 wherein the at least one radiant energy source includes a plurality of radiant energy sources arranged in a one-dimensional array, a two-dimensional array or in a three-dimensional array, the light impinging on the printing substrate at a plurality of positions.

6. The device for supplying radiant energy as recited in claim 1 further comprising a control unit for controlling the light at the position in intensity and exposure time for each radiant energy source of the at least one radiant energy source independently of the other radiant energy sources.

7. The device for supplying radiant energy as recited in claim 1 wherein the wavelength is 870.00 nm±50.00 nm and/or 1050.00 nm±50.00 nm and/or 1250.00 nm±50.00 nm and/or 1600.00 nm±50.00 nm.

8. The device for supplying radiant energy as recited in claim 1 wherein the at least one radiant light source includes two radiant energy sources emitting light impinging at a same position on the printing substrate.

9. A planographic printing press comprising:
   at least two printing units for printing a printing substrate having a path, one of the printing units being a last printing unit having a last printing nip; and
   a device for supplying radiant energy having at least one radiant energy source providing light to the printing substrate on the path at a position downstream of the last printing nip;
   the radiant energy source emitting only light having a wavelength non-resonant to absorption wavelengths of water.

10. A planographic printing press comprising:
   at least one printing unit for printing a printing substrate having a path and having at least one printing nip; and
   a device for supplying radiant energy having at least one radiant energy source providing light to the printing substrate on the path at a position downstream of the at least one printing nip;
   the radiant energy source emitting only light having a wavelength non-resonant to absorption wavelengths of water.

11. A method for supplying radiant energy of a wavelength in the near infrared onto a printing substrate in a planographic printing press comprising:
   irradiating the printing substrate with light from at least one radiant energy source, the light impinging on the printing substrate on a path of the printing substrate through the printing press at a position downstream of at least one printing nip in a printing unit of the printing press where printing ink is applied, and
   adding at least one infrared-absorbing agent to the printing ink so as to assist absorption of the radiant energy in the printing ink.

12. The method for supplying radiant energy as recited in claim 11 wherein the irradiating step is performed by a device for supplying radiant energy having at least one radiant energy source providing the light to the printing substrate, the radiant energy source emitting only light having a wavelength non-resonant to absorption wavelengths of water.

13. The method for supplying radiant energy as recited in claim 12 wherein the light emitted by radiant energy source is resonant to an absorption maximum of the infrared-absorbing agent.

14. The method for supplying radiant energy as recited in claim 11 wherein the infrared-absorbing agent is one of the following substances: benzenaminium-N,N'-2,5-cyclohexadiene-1,4-diylidenebis[4-(dibutylamino)-N-[4-(dibutylamino)phenyl]diperchlorate, Bis(3,4-dimethoxy-2'chlorodithiobenzil)nickel,
   3-butyl-2(2-[-2-(3-butyl-1,1-dimethyl-1,3-dihydro-benzo[e]indol-2-ylidene)ethylidene]-2-chloro-cyclohex-1-enyl]-ethenyl)-1,1-dimethyl-1H-benzo[e]indolium perchlorate, and
   2[2-[2chloro-3-[2-(3-ethyl-1,3-dihydro-1,1-dimethyl-2H-benzo[e]indol-2-ylidene)-ethylidene]-1cyclohexen-1-yl]-ethenyl]3-ethyl-1,1dimethyl-1H-benzo[e]indolium tetraflouroborate.

15. The method for supplying radiant energy as recited in claim 11 wherein additional printing inks are used for printing, the planographic printing press having a plurality of printing units, the printing ink being blended with the infrared-absorbing agent prior to using the printing ink in printing.

* * * * *